(12) United States Patent
Han

(10) Patent No.: US 12,557,525 B2
(45) Date of Patent: Feb. 17, 2026

(54) DISPLAY MODULES AND DISPLAY DEVICES

(71) Applicant: WUHAN CHINA STAR OPTOELECTRONICS SEMICONDUCTOR DISPLAY TECHNOLOGY CO., LTD., Hubei (CN)

(72) Inventor: Wen Han, Hubei (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 178 days.

(21) Appl. No.: 18/687,834

(22) PCT Filed: Jan. 15, 2024

(86) PCT No.: PCT/CN2024/072293
§ 371 (c)(1),
(2) Date: Feb. 29, 2024

(87) PCT Pub. No.: WO2025/148079
PCT Pub. Date: Jul. 17, 2025

(65) Prior Publication Data
US 2025/0248268 A1     Jul. 31, 2025

(30) Foreign Application Priority Data
Jan. 8, 2024   (CN) ..................... 202410026397.5

(51) Int. Cl.
*H10K 59/80* (2023.01)
*G06F 1/16* (2006.01)
(Continued)

(52) U.S. Cl.
CPC ......... *H10K 59/872* (2023.02); *G06F 1/1652* (2013.01); *H10K 77/111* (2023.02); *H10K 2102/311* (2023.02)

(58) Field of Classification Search
CPC combination set(s) only.
See application file for complete search history.

(56) References Cited

U.S. PATENT DOCUMENTS

| | | | |
|---|---|---|---|
| 8,199,479 B2* | 6/2012 | Matsuoka | G06F 1/1637 361/679.55 |
| 11,806,974 B2* | 11/2023 | Cao | B32B 3/02 |

(Continued)

FOREIGN PATENT DOCUMENTS

| | | |
|---|---|---|
| CN | 108831303 A | 11/2018 |
| CN | 112053632 A | 12/2020 |

(Continued)

OTHER PUBLICATIONS

International Search Report in International application No. PCT/CN2024/072293, mailed on Sep. 18, 2024.

(Continued)

*Primary Examiner* — Lisa Lea-Edmonds
(74) *Attorney, Agent, or Firm* — PV IP PC; Wei Te Chung

(57) ABSTRACT

A display module and a display device are provided, the display module includes a planar region and a curved region located outside the planar region. A backplane of the display module includes a planar portion disposed corresponding to the planar region and a curved portion disposed corresponding to the curved region. A first groove is disposed at a corner portion of the curved portion. The backplane further includes a first sub-backplane and a second sub-backplane. The first groove penetrates through the first sub-backplane to alleviate the problem that bubbles are easily appearing at the (Continued)

Gaussian curved surface of the existing four-curved screen after laminating.

20 Claims, 7 Drawing Sheets

(51) Int. Cl.
  *H10K 77/10* (2023.01)
  *H10K 102/00* (2023.01)

(56) References Cited

U.S. PATENT DOCUMENTS

| | | | |
|---|---|---|---|
| 12,041,810 B2* | 7/2024 | Roh | G06F 1/1652 |
| 12,232,349 B2* | 2/2025 | Wang | G02F 1/133305 |
| 12,262,620 B2* | 3/2025 | You | H04M 1/0269 |
| 12,292,766 B2* | 5/2025 | Jia | G06F 1/1626 |
| 12,373,005 B2* | 7/2025 | Zhou | G06F 1/1626 |
| 12,411,522 B2* | 9/2025 | Wang | G06F 1/1637 |
| 2022/0080697 A1* | 3/2022 | Cao | B32B 3/02 |
| 2022/0085321 A1* | 3/2022 | Wang | G09F 9/301 |
| 2022/0344615 A1* | 10/2022 | Li | H01L 25/18 |
| 2024/0007555 A1* | 1/2024 | Han | H04M 1/0237 |
| 2024/0040903 A1* | 2/2024 | You | H04M 1/0269 |
| 2024/0302866 A1* | 9/2024 | Jia | G06F 1/1652 |
| 2025/0151578 A1* | 5/2025 | Duan | H10K 59/126 |
| 2025/0248268 A1* | 7/2025 | Han | H10K 77/111 |

FOREIGN PATENT DOCUMENTS

| | | |
|---|---|---|
| CN | 112599018 A | 4/2021 |
| CN | 116259231 A | 6/2023 |
| WO | 2023103065 A1 | 6/2023 |

OTHER PUBLICATIONS

Written Opinion of the International Search Authority in International application No. PCT/CN2024/072293, mailed on Sep. 18, 2024.

* cited by examiner ance on the Patent Application No. 202410026397.5, filed on
DISPLAY MODULES AND DISPLAY DEVICES

CROSS REFERENCE TO RELATED APPLICATIONS

This application is a US national phase application based upon an International Application No. PCT/CN2024/072293, filed on Jan. 15, 2024, which claims priority to Chinese Patent Application No. 202410026397.5, filed on Jan. 8, 2024, and entitled "Display Modules and Display Devices". The entire disclosures of the aforementioned applications are incorporated herein by reference in their entireties.

TECHNICAL FIELD

The present disclosure relates to display technologies, and in particular, to display modules and display devices.

BACKGROUND

With the development of display technology, curved screens have become a hot topic in the current display field. The curvature of side surfaces of a curved screen can increase the display area, increase the screen ratio, and give users a better sensory experience. Curved screens include hyperbolic screens formed by two opposite side surfaces of a display screen having certain curvatures, and four-curved screens formed by four side surfaces of a display screen having certain curvatures. Compared with the hyperboloid screen, the performance of the four-curved screen has been greatly improved in terms of the screen ratio of the screen. The four-curved screen is generally formed by laminating a display panel and a cover plate with a curved surface together. For a four-curved screen, the intersecting position of edges of two adjacent curved surfaces forms a Gaussian curved surface, and bubbles are prone to appear at the Gaussian curved surface after laminating.

SUMMARY

The present disclosure provides a display module and a display device to alleviate the technical problem that bubbles are prone to appear at the Gaussian curved surface of the existing four-curved screen after laminating.

In order to solve the above problem, technical solutions provided by the present disclosure are as follows.

In a first aspect, an embodiment of the present disclosure provides a display module including a planar region and a curved region located outside the planar region; the display module further includes:

a display panel; and a backplane disposed on a non-light-exiting side of the display panel, the backplane includes a planar portion disposed corresponding to the planar region and a curved portion disposed corresponding to the curved region, and the curved portion includes a plurality of edge portions and corner portions connected between two adjacent ones of the edge portions;

the backplane further includes a first sub-backplane and a second sub-backplane located on a side of the first sub-backplane close to the display panel, a first groove is disposed on a side of one of the corner portions away from the display panel, and the first groove penetrates through the first sub-backplane.

In a second aspect, an embodiment of the present disclosure provides a display device including the display module described in the above embodiment.

BRIEF DESCRIPTION OF THE DRAWINGS

In order to illustrate the technical solutions in the embodiments or in the prior art more clearly, drawings that are required to be used in the description of the embodiments or the prior art will be briefly introduced below. Apparently, the drawings in the following description are merely some embodiments of the present disclosure. For those of ordinary skill in the art, other drawings can be obtained based on these drawings without making creative efforts.

DETAILED DESCRIPTION

Figure 1:
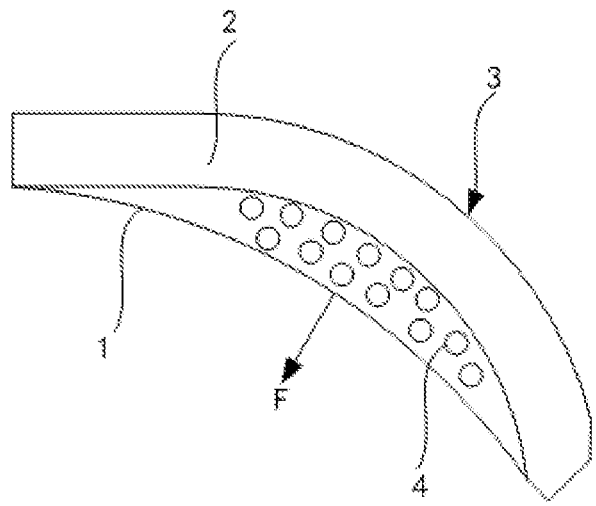
FIG. 1 is a schematic diagram of a Gaussian curved surface generating bubbles of an existing four-curved screen.

The various embodiments are illustrated with reference to the accompanying drawings below to exemplarily illustrate specific embodiments through which the present disclosure may be implemented. Directional terms mentioned in this disclosure, for example, "upper", "lower", "front", "back", "left", "right", "inner", "outer", "side", and the like, are merely directions with reference to the accompanying drawings. Therefore, the directional terms used herein are intended to illustrate and understand the present disclosure, but not to limit the present disclosure. In the drawings, units with similar structures are represented by the same reference numerals. In the drawings, thicknesses of some layers and regions are exaggerated for clarity of understanding and ease of description. That is, the size and thickness of each component shown in the drawings are arbitrarily shown, but the present disclosure is not limited thereto.

In view of the problem that bubbles are prone to appear at the Gaussian curved surface of the existing four-curved screen after laminating, the inventor of the present disclosure discovered during the research that: the four-curved screen is generally formed by laminating a display panel having a backplane with a cover plate having a curved surface. The backplane is located on the side of the display panel away from the cover plate to support the display panel. The display panel and the cover plate are laminated together through a transparent optical adhesive, and the transparent optical adhesive includes optically clear adhesive (OCA). There are horizontal and vertical bending and overlapping regions at the four top corners of the four-curved screen. The display panel will be compressed when it is laminated with the cover plate and enters the bending and overlapping regions. This bending and overlapping region is called a Gaussian corner region, and a surface in the bending and overlapping region is called a Gaussian curved surface. When the display panel completely enters the Gaussian corner region, the Gaussian curved surface in the Gaussian corner region can display, so that a four-curved screen with a high screen ratio can be realized. However, as the area of the display panel entering the Gaussian corner region becomes larger, the amount of compression on the backplane and display panel becomes greater. As the amount of compression becomes larger, when the display panel and the cover plate are laminated, wrinkles will more likely to appear at the Gaussian curved surface, and metal wires and inorganic layers inside the display panel are more prone to failure problems such as breakage. Moreover, referring to FIG. 1, FIG. 1 is a schematic diagram of a Gaussian curved surface generating bubbles of an existing four-curved screen. After the display panel 1 is laminated with the cover plate 2, the backplane and the display panel 1 are greatly compressed in the Gaussian corner region. The backplane, as the supporting body of the display panel 1, has a relatively higher elastic modulus, so that the backplane will generate a relatively large rebound force F. When the rebound force F is greater than the adhesive force of the transparent optical adhesive between the display panel 1 and the cover plate 2, the display panel 1 and the cover plate 2 will peel in the Gaussian corner region, which will cause rebound bubbles 4 to appear at the Gaussian curved surface 3.

In view of the above, the present disclosure provides a display module and a display device to solve the above problems.

Specifically, an embodiment of the present disclosure provides a display module including a planar region and a curved region located outside the planar region; the display module further includes:
  a display panel; and
  a backplane disposed on a non-light-exiting side of the display panel, the backplane includes a planar portion disposed corresponding to the planar region and a curved portion disposed corresponding to the curved region, and the curved portion includes a plurality of edge portions and corner portions connected between two adjacent ones of the edge portions;
  the backplane further includes a first sub-backplane and a second sub-backplane located on a side of the first sub-backplane close to the display panel, a first groove is disposed on a side of one of the corner portions away from the display panel, and the first groove penetrates through the first sub-backplane.

In one embodiment, a thickness of each of the first sub-backplane and the second sub-backplane is greater than or equal to 25 microns, and a thickness of the backplane is less than or equal to 200 microns.

In one embodiment, an elastic modulus of the backplane is greater than or equal to 3 GPa.

In one embodiment, the first groove extends from the at least one of the corner portions to an adjacent edge portion of the edge portions, and an extension length of the first groove in the adjacent edge portion is less than an extension length of the first groove in the at least one of the corner portions.

In one embodiment, the extension length of the first groove in the adjacent edge portion is greater than or equal to 0 millimeters and less than or equal to 1 millimeter.

In one embodiment, a width of the first groove is greater than 0 microns and less than or equal to 0.5 microns.

In one embodiment, a minimum distance between the first groove and a boundary of the at least one of the corner portions away from the planar portion is greater than 0.

In one embodiment, in a direction pointing from the planar portion to the at least one of the corner portions, an arc length of the at least one of the corner portions is L, and a distance between the first groove and the boundary of the at least one of the corner portions away from the planar portion is L', wherein $\frac{1}{3}L \leq L' \leq \frac{2}{3}L$.

In one embodiment, $L' = \frac{1}{2}L$.

In one embodiment, the curved region includes a first display region and a frame region located on a side of the first display region away from the planar region, and the first groove is disposed corresponding to the first display region.

In one embodiment, a second groove is disposed on a side of at least one of the edge portions away from the display panel, and the second groove is spaced apart from the first groove.

In one embodiment, a cross-sectional shape of the first groove comprises at least one of an arc line and a curved line; and/or, a cross-sectional shape of the second groove comprises at least one of a straight line and a curved line.

In one embodiment, the first groove comprises a plurality of first sub-grooves disposed at intervals; and/or, the second groove comprises a plurality of second sub-grooves disposed at intervals.

In one embodiment, the display module further includes a protective layer and a support functional layer, the protective layer is disposed on a side of the display panel away from the backplane, and the support function layer is disposed on a side of the backplane away from the display panel.

An embodiment of the present disclosure further provides a display device including any one of the display module described in the above embodiments.

In the display module and the display device provided by the present disclosure, the display module includes a planar region and a curved region located outside the planar region; the display module further includes a display panel and a backplane disposed on a non-light-exiting side of the display panel. The backplane includes a planar portion disposed corresponding to the planar region and a curved portion disposed corresponding to the curved region. The curved portion includes a plurality of edge portions and corner portions connected between two adjacent ones of the edge portions. A first groove is disposed on a side of at least one of the corner portions away from the display panel. The backplane further includes a first sub-backplane and a second sub-backplane located on a side of the first sub-backplane close to the display panel. The first groove penetrates through the first sub-backplane. The first groove can release the bending stress in the corner portions of the backplane to reduce the rebound force at the corner portions of the backplane, thereby reducing the risk of appearance of rebound bubbles caused by the peeling between the display panel and the cover plate with a curved surface, and thus addressing the technical problem that bubbles are easily appearing at the Gaussian curved surface of the existing four-curved screen after laminating.

The display module and display device of the present disclosure will be described below with reference to the accompanying drawings and specific embodiments.

Figure 2:
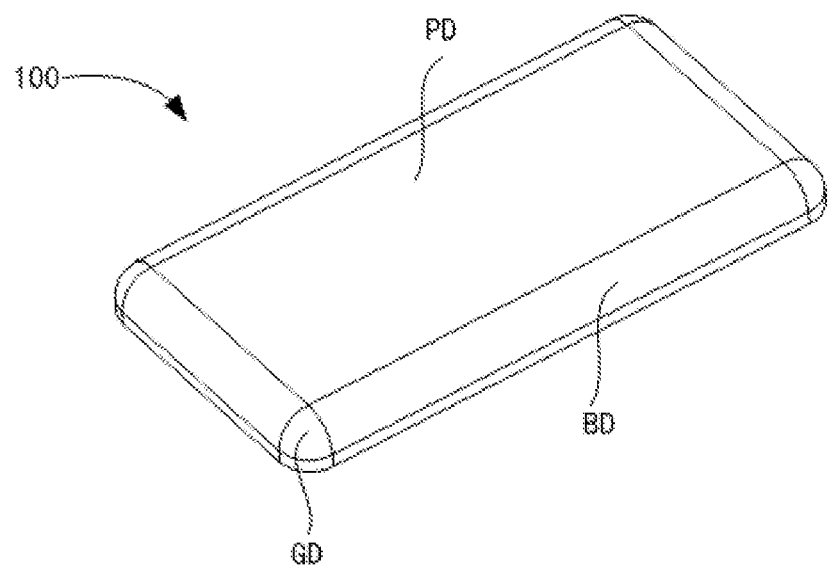
FIG. 2 is a schematic diagram of an overall structure of a display module provided by an embodiment of the present disclosure.
Figure 3:
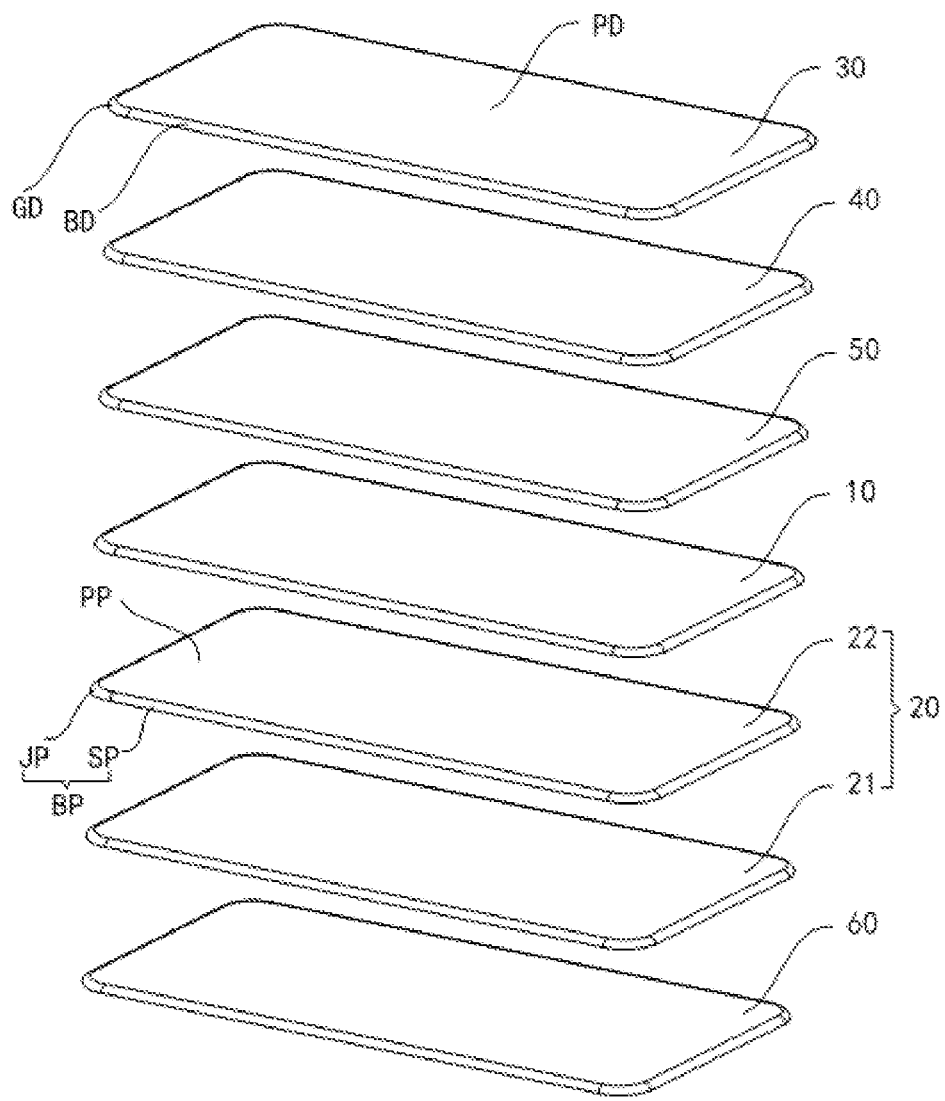
FIG. 3 is a schematic diagram of a disassembled structure of the display module shown in FIG. 2.
Figure 4:
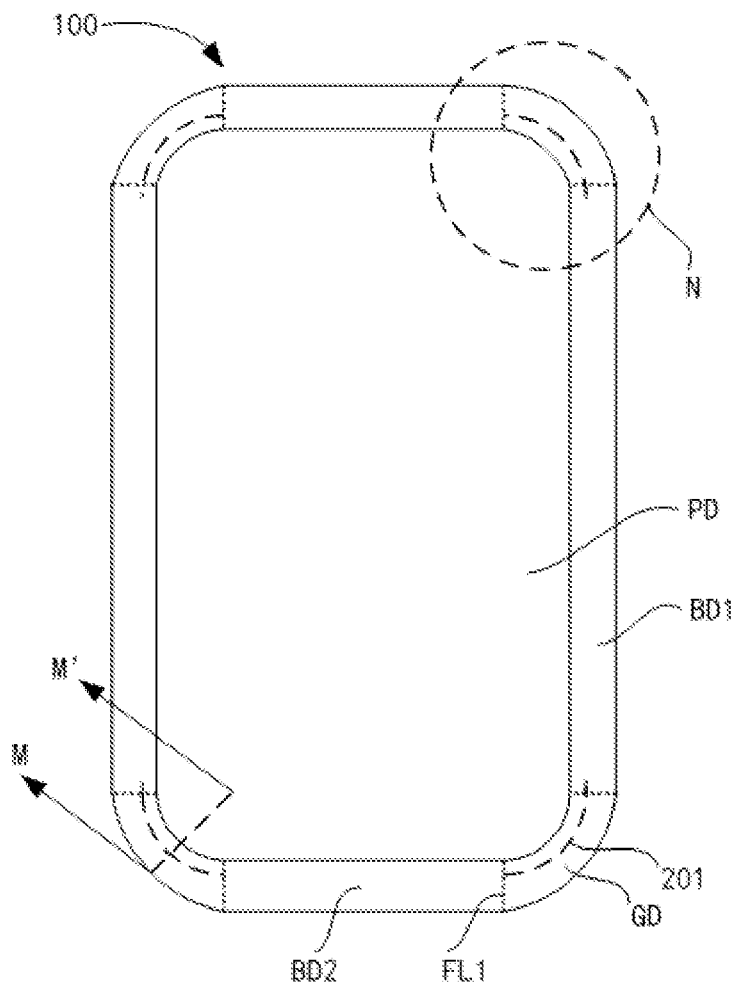
FIG. 4 is a schematic diagram of a planar structure of the display module shown in FIG. 2.
Figure 5:
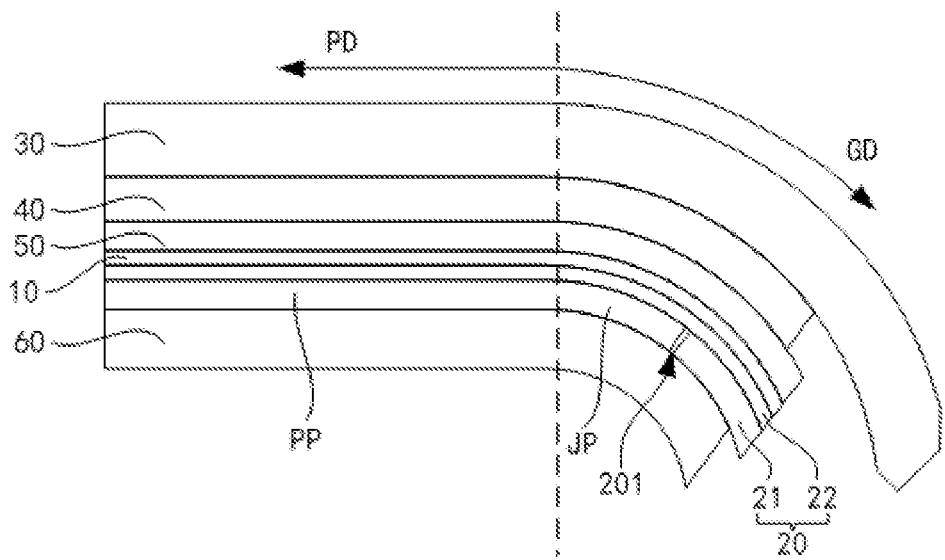
FIG. 5 is a schematic diagram of a cross-sectional structure along M-M' direction shown in FIG. 4.
Figure 6:
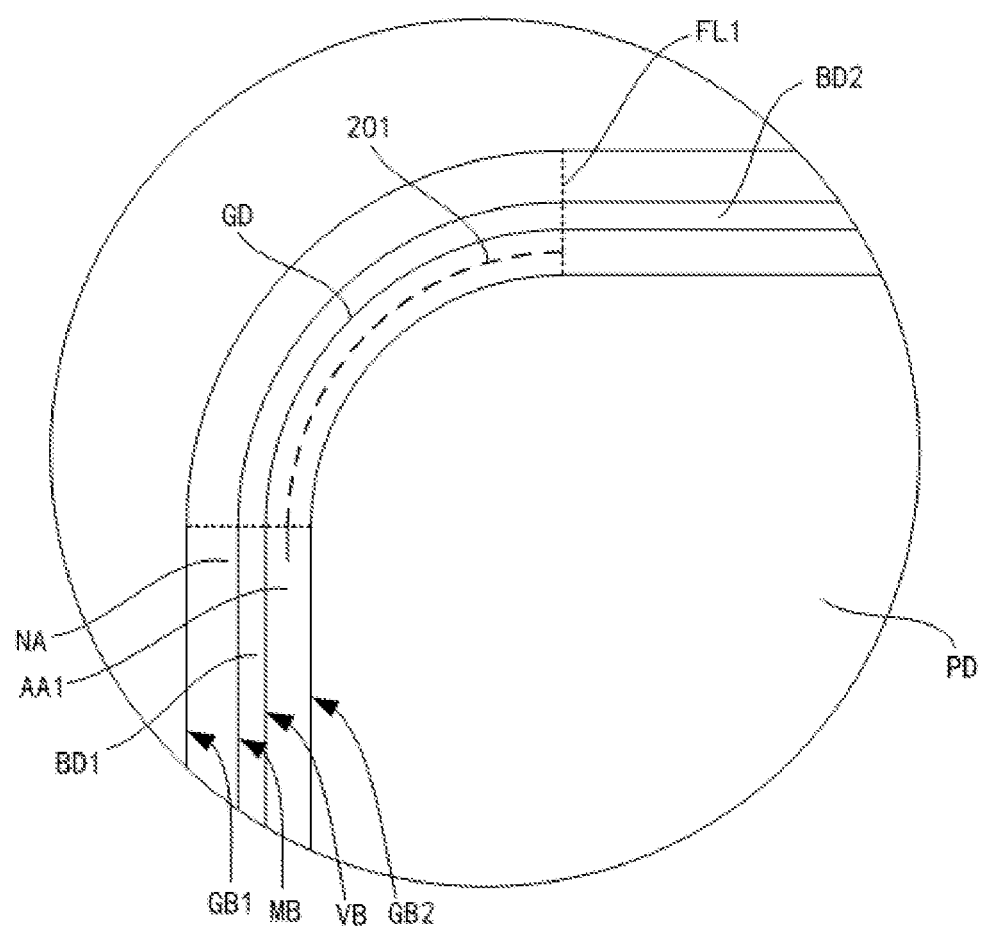
FIG. 6 is a schematic diagram of a detailed structure at position N shown in FIG. 4.
Figure 7:
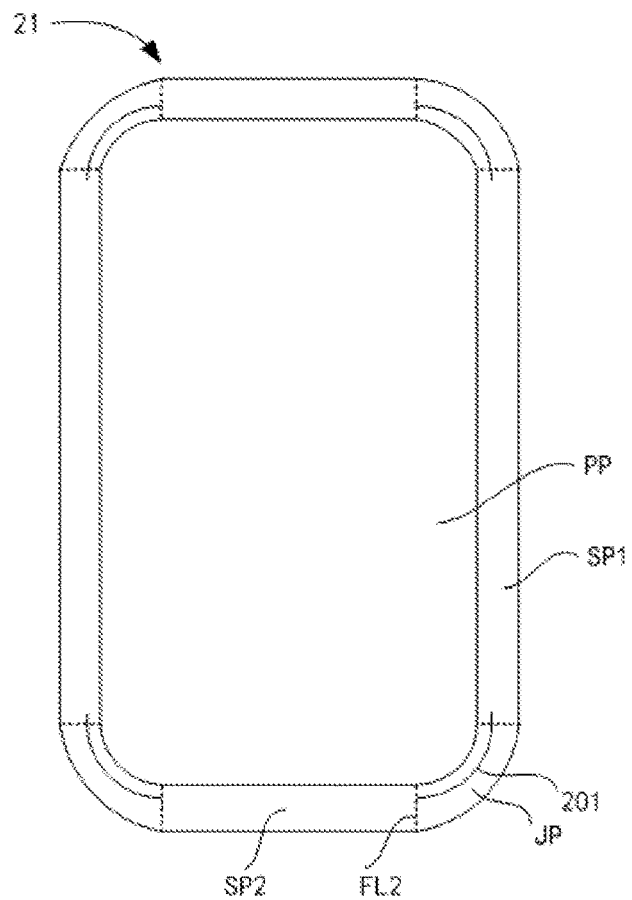
FIG. 7 is a schematic diagram of a planar structure of a backplane in FIG. 3.

Referring to FIG. 2 to FIG. 7, FIG. 2 is a schematic diagram of an overall structure of a display module provided by an embodiment of the present disclosure, FIG. 3 is a schematic diagram of a disassembled structure of the display module shown in FIG. 2, FIG. 4 is a schematic diagram of a planar structure of the display module shown in FIG. 2, FIG. 5 is a schematic diagram of a cross-sectional structure along M-M' direction shown in FIG. 4, and FIG. 6 is a schematic diagram of a detailed structure at position N shown in FIG. 4. FIG. 7 is a schematic diagram of a planar structure of a backplane in FIG. 3. Referring to FIG. 2, the display module 100 includes a planar region PD and a curved region BD located outside the planar region PD. The curved region BD surrounds the planar region PD. The curved region BD includes Gaussian corner regions GD located at the top corners of the display module 100, that is, the Gaussian corner region GD is a region formed by the overlap of two adjacent curved regions BD located outside the planar region PD.

Referring to FIG. 3, the display module 100 further includes a display panel 10 and a backplane 20 disposed on the non-light-exiting side of the display panel 10. The display panel 10 includes a flexible organic light emitting diode (OLED) panel and the like, and the flexible organic light emitting diode display panel 10 has properties such as being foldable, bendable. The non-light-exiting side of the display panel 10 refers to the side away from the light exiting side of the display panel 10, and the light exiting side of the display panel 10 refers to the side of the display panel 10 that can display pictures. The backplane 20 is disposed on the non-light-exiting side of the display panel 10 and is used to support the display panel 10. The material of the backplane 20 includes poly ethylene terephthalate (PET) and the like.

Furthermore, the display module 100 further includes a protective layer 30 disposed on the light exiting side of the display panel 10, that is, the protective layer 30 and the backplane 20 are disposed on opposite sides of the display panel 10. The protective layer 30 has high light transmittance and high hardness. For example, the protective layer 30 is a glass cover plate. The display panel 10 can be laminated with the protective layer 30 through a transparent adhesive layer 40, and the transparent adhesive layer 40 includes OCA adhesive. Apparently, optionally, the display module 100 may further include a polarizer 50 disposed on the light exiting side of the display panel 10. The polarizer 50 is configured to reduce the reflectivity of the surface of the display panel 10. The polarizer 50 can be attached to the surface of the display panel 10, or directly manufactured on the surface of the display panel 10. When the display module 100 includes the polarizer 50, the polarizer 50 is laminated with the protective layer 30 through the adhesive layer 40, so that the display panel 10 is laminated with the protective layer 30.

Optionally, the display module 100 further includes a support functional layer 60 disposed on the side of the backplane 20 away from the display panel 10. The support functional layer 60 is configured to cooperate with the backplane 20 to support the display panel 10, and plays a role of heat dissipation for the display panel 10. The support functional layer 60 may include a plurality of stacked sub-layers, such as a foam layer, a heat dissipating layer and a metal layer. The material of the foam layer includes foam which has relatively large elastic deformation properties. The material of the heat dissipating layer includes materials with excellent thermal conductivity or heat dissipation properties, such as graphite. The material of the metal layer includes copper foil, and the like.

Referring to FIG. 3, FIG. 4 and FIG. 5, the backplane 20 includes a planar portion PP disposed corresponding to the planar region PD and a curved portion BP disposed corresponding to the curved region BD. The curved portion BP includes a plurality of edge portion SP and corner portions JP connected between two adjacent edge portions SP, and the corner portions JP are disposed corresponding to the Gaussian corner region GD. A first groove 201 is disposed on the side of one of the corner portions JP away from the display panel 10. The first groove 201 can release the bending stress in the corner portion JP of the backplane 20 to reduce the rebound force of the corner portion JP of the backplane 20. Thereby reducing the risk of appearance of rebound bubbles caused by the peeling between the display panel 10 and the cover plate with a curved surface, and thus addressing the problem that bubbles are prone to appear at the Gaussian curved surface of the existing four-curved screen after laminating.

Referring to FIG. 4, in order to easily distinguish the curved region BD on the display module 100, the curved region BD is divided into first sub-curved regions BD1 and second sub-curved regions BD2, and Gaussian corner regions GD located between two adjacent first sub-curved region BD1 and second sub-curved region BD2. In FIG. 4, the first dividing line FL1 is used to represent the boundary between various curved regions BD. The curved region BD includes two opposite first sub-curved regions BD1 and two opposite second sub-curved regions BD2 and four Gaussian corner regions GD. The area of each first sub-curved region BD1 is larger than the area of each second sub-curved region BD2. The first groove 201 is at least disposed corresponding to the Gaussian corner region GD.

Referring to FIG. 5, the depth of the first groove 201 is less than the thickness of the backplane 20, that is, the first groove 201 does not completely penetrate through the backplane 20, and the first groove 201 only forms on the side of the backplane 20 away from the display panel 10, so that the surface of the backplane 20 on the side close to the display panel 10 is complete. That is, the backplane 20 and the display panel 10 are fully laminated, so that the backplane 20 provides effective support to the display panel 10, thereby avoiding appearance problems of the display panel 10, such as poor die marks.

The width of the first groove 201 is greater than 0 microns and less than or equal to 0.5 microns, that is, the first groove 201 is a linear groove. For example, the first groove 201 is formed by using a cutting process, the cutting groove with a relatively small width formed after cutting is the first groove 201. In this way, by providing the first groove 201 with a relatively small width, it is possible to avoid significant impact on the support performance of the backplane 20 after providing the first groove 201 at the corner portion JP, so as to ensure the overall support performance of the backplane 20 to the display panel 10 in the Gaussian corner region GD. The inventor of the present disclosure has found during research that when the display panel 10 and the protective layer 30 are laminated, the support capacity of the backplane 20 to the display panel 10 corresponding to the Gaussian corner region GD will affect the wrinkles in the Gaussian corner region GD. In the Gaussian corner region GD, enhancing the supporting force of the backplane 20 to the display panel 10 can eliminate or reduce the risk of appearance of wrinkles in the Gaussian corner region GD. Therefore, in the present disclosure, by providing the first groove 201 with an appropriate width range on the corner portion JP of the backplane 20, while eliminating or alleviating the problem of rebound bubbles, the risk of appearance of wrinkles in the Gaussian corner region GD can also be eliminated or reduced.

Optionally, the backplane 20 includes a first sub-backplane 21 and a second sub-backplane 22. The first sub-backplane 21 is located on the side of the second sub-backplane 22 away from the display panel 10, and the first groove 201 penetrates through the first sub-backplane 21. The thickness of the first sub-backplane 21 is the same as the thickness of the second sub-backplane 22. For example, the thickness of each of the first sub-backplane 21 and the second sub-backplane 22 is greater than or equal to 25 microns, and the thickness of the backplane 20 is less than or equal to 200 microns, so as to balance the supporting force and rebound force of the backplane 20. For example, the thickness of the backplane 20 is 200 microns, 195 microns, 190 microns, 185 microns, 180 microns, 170 microns, 160 microns, 150 microns, and the like. When the thickness of the backplane 20 is too small, it may not be able to effectively support the display panel 10. When the thickness of the backplane 20 is too large, the rebound force of the backplane 20 at the corner portion JP will be increased, which is not conducive to eliminating or alleviating the problem of rebound bubbles. Therefore, the thickness of the backplane 20 is set to be less than or equal to 200 microns, so that the supporting force and the rebound force of the backplane 20 can be balanced. while eliminating or alleviating the problem of rebound bubbles, the risk of appearance of wrinkles in the Gaussian corner region GD can also be eliminated or reduced.

In another embodiment, the thickness of the first sub-backplane 21 is greater than the thickness of the second sub-backplane 22. For example, the thickness of the first sub-backplane 21 is 100 microns, and the thickness of the second sub-backplane 22 is 40 microns. In this way, on the premise that the backplane 20 on the whole provides effective support to the display panel 10, the first groove 201 with a relatively large depth can also be provided on the first sub-backplane 21, so as to better release the bending stress in the corner portion JP.

Optionally, the elastic modulus of the backplane 20 is greater than or equal to 3 GPa, so that the backplane 20 can better support the display panel 10, and prevent wrinkles from appearing in the Gaussian corner region GD when the display panel 10 is laminated with the protective layer 30.

The structure of the first groove 201 will be further described in detail below.

Referring to FIG. 5, the first groove 201 is located in the Gaussian corner region GD. In the Gaussian corner region GD, the outer boundary of the display panel 10 is flush with the outer boundary of the back plate 20, and the outer boundary of the protective layer 30 extends beyond the outer boundaries of the display panel 10 and the backplane 20. That is, the outer boundary of the protective layer 30 is the outer boundary of the display module 100, and the region between the outer boundary of the protective layer 30 and the outer boundary of the planar region PD is the curved region BD.

Referring to FIG. 6, the curved region BD includes a first display region AA1 and a frame region NA located on the side of the first display region AA1 away from the planar region PD, that is, the curved region BD of the display module 100 can also be used for display to increase the screen ratio. The region between the outer boundary GB2 of the planar region PD and the outer boundary VB of the first display region AA1 is the first display region AA1. The region between the outer boundary VB of the first display region AA1 and the outer boundary GB1 of the display module 100 is the frame region NA. The outer boundaries MB of the display panel 10 and the backplane 20 are located in the frame region NA, that is, the outer boundaries MB of the display panel 10 and the backplane 20 are located between the outer boundary VB of the first display region AA1 and the outer boundary GB1 of the display module 100.

Referring to FIG. 6 and FIG. 7, the minimum distance between the first groove 201 and the boundary of the corner portion JP away from the planar portion PP is greater than 0, that is, the distance between the first groove 201 and the outer boundary of the corner portion JP of the backplane 20 is greater than 0. In other words, in the direction pointing from the planar portion PP to the corner portion JP, the first groove 201 does not penetrate through the corner portion JP. So that in the Gaussian corner region GD, the marginal region of the display panel 10 is still supported by the backplane 20. While the marginal region of the display panel 10 is a region with a relatively large Gaussian curvature at which wrinkles easily appear. By retaining the backplane 20 corresponding to this marginal region, the overall rigidity of the backplane 20 in the Gaussian corner region GD can be ensured to provide effective support to the marginal region of the display panel 10, therefore, while eliminating or alleviating the problem of rebound bubbles, the risk of wrinkles appearing in the Gaussian corner region GD can also be eliminated or reduced.

Optionally, the first groove 201 is disposed corresponding to the first display region AA1, so that the first groove 201 is away from the outer boundary of the backplane 20. In this way, in the Gaussian corner region GD, the backplane 20 has a corner portion JP with a relatively large area to support the marginal region of the display panel 10, thereby further eliminating or reducing the risk of wrinkles appearing in the Gaussian corner region GD.

Referring to FIG. 7, the first groove 201 extends from the corner portion JP to the adjacent edge portion SP, so that the first groove 201 is at least disposed in the entire Gaussian corner region GD, thereby better eliminating or alleviating the rebound bubble problems. However, the extension length of the first groove 201 in the edge portion SP should not be too large to avoid having a greater impact on the support performance of the backplane 20 in the Gaussian corner region GD. Optionally, the extension length of the first groove 201 in the edge portion SP is smaller than the extension length of the first groove 201 in the corner portion JP. For example, the extension length of first groove 201 in the edge portion SP is greater than or equal to 0 millimeters and less than or equal to 1 millimeter.

Specifically, on the first sub-backplane 21, in order to facilitate the distinction between the edge portion SP and the corner portion JP, the second dividing line FL2 is used as the boundary line between the edge portion SP and the corner portion JP in FIG. 7. The edge portion SP includes two opposite first sub-edge portions SP1 and two opposite second sub-edge portions SP2. The first sub-edge portions SP1 correspond to the first sub-curved regions BD1, and the second sub-edge portions SP1 correspond to the second sub-curved regions BD2. The area of each of the first sub-edge portions SP1 is larger than the area of each of the second sub-edge portions SP2, and a corner portion JP is connected to adjacent first sub-edge portion SP2 and second sub-edge portion SP2. The first groove 201 extends from the corner portion JP to the adjacent first sub-edge portion SP1, but does not extend to the adjacent second sub-edge portion SP2, so as to ensure effective support of the second sub-edge portion SP2 to the display panel 10. Optionally, the cross-sectional shape of the first groove 201 is an arc line, that is, the surface shape of the first groove 201 is an arc line.

Next, the way to determine the position of the first groove 201 will be explained in detail.

Figure 8:
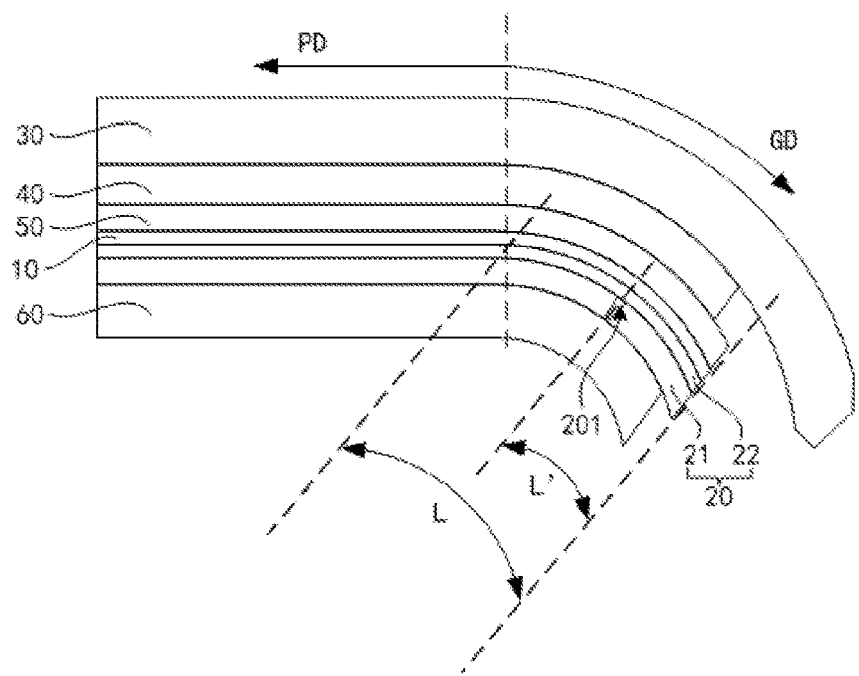
FIG. 8 is a detailed schematic diagram of a disposing position of a first groove provided by an embodiment of the present disclosure.
Figure 9:
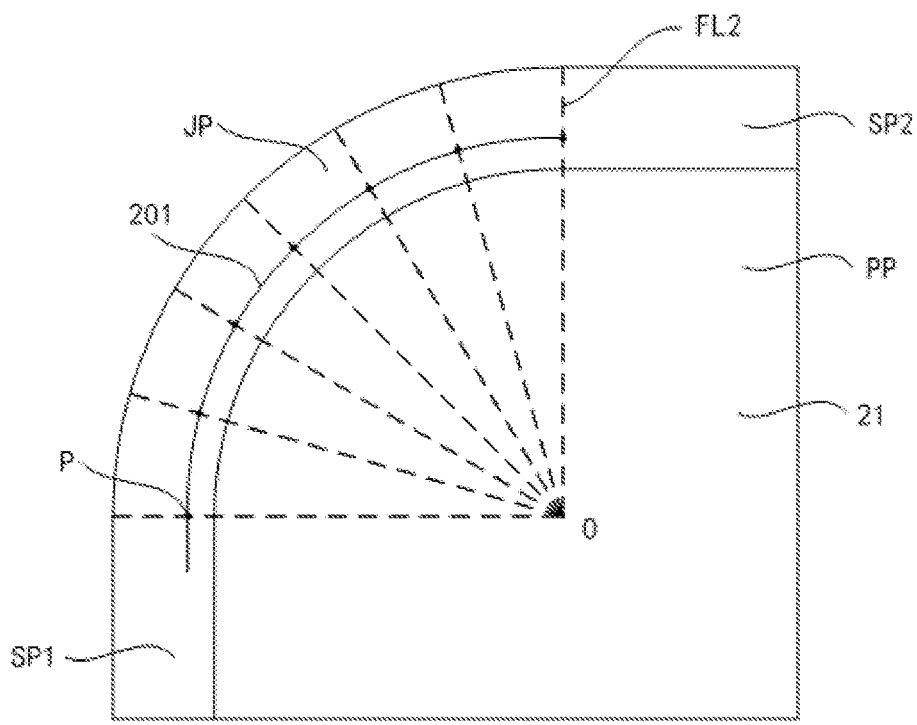
FIG. 9 is a schematic diagram of a disposing principle of a first groove provided by an embodiment of the present disclosure.
Figure 10:
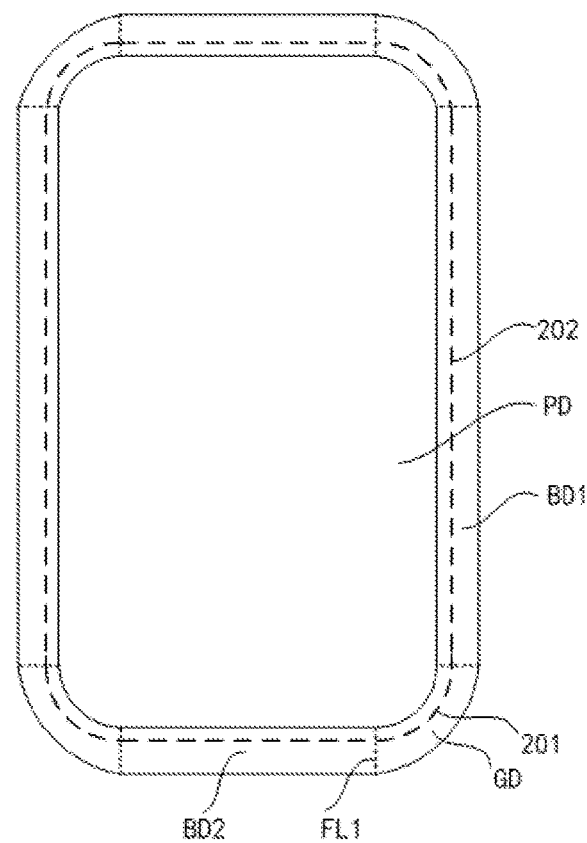
FIG. 10 is a schematic diagram of another planar structure of a display module provided by an embodiment of the present disclosure.
Figure 11:
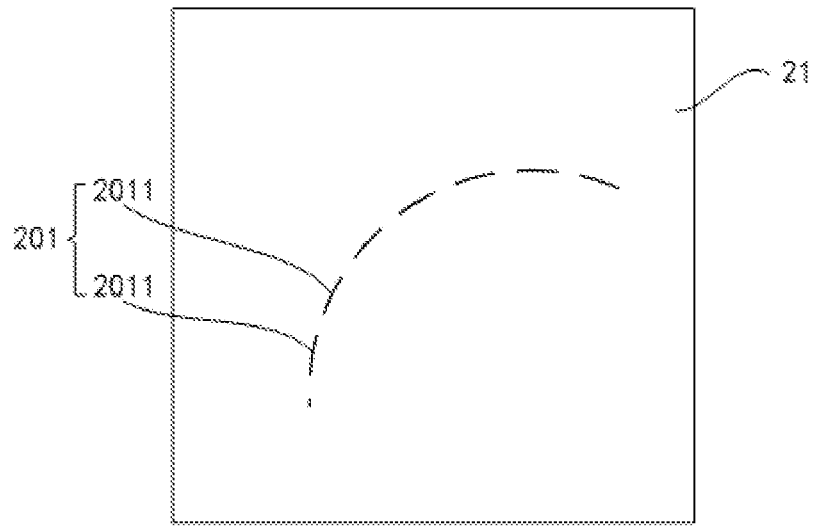
FIG. 11 is a schematic diagram of another structure of a first groove provided by an embodiment of the present disclosure.
Figure 12:
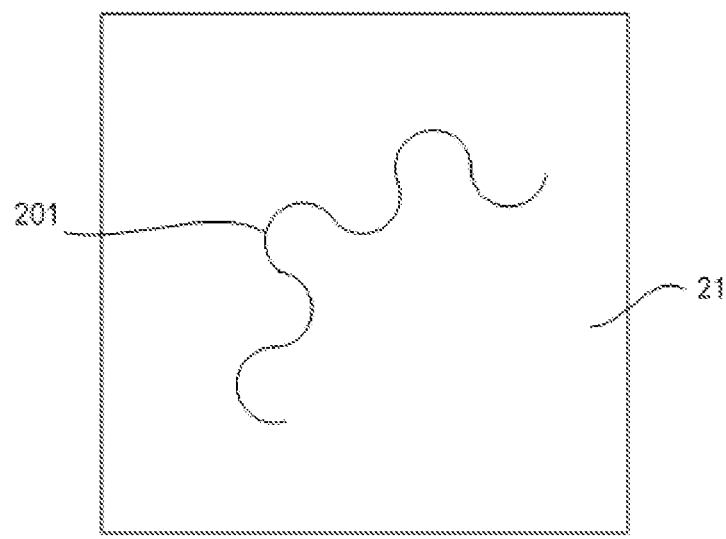
FIG. 12 is a schematic diagram of yet another structure of a first groove provided by an embodiment of the present disclosure.

Referring to FIG. 8 and FIG. 9, FIG. 8 is a detailed schematic diagram of a disposing position of a first groove provided by an embodiment of the present disclosure, and FIG. 9 is a schematic diagram of a disposing principle of a first groove provided by an embodiment of the present disclosure. Referring to FIG. 8, in the direction pointing from the planar portion PP to the corner portion JP, the arc length of the corner portion JP is L, and the distance between the first groove 201 and the boundary of the corner portion JP away from the planar portion PP is L', in which ⅓ L≤L'≤⅔ L. That is, the first groove 201 is located in the middle region of the corner portion JP. The middle region of the corner portion JP is a region where the rebound force is the greatest, and rebound bubbles are more likely to appear in this region. By disposing the first groove 201 in the middle region of the corner portion JP, the problem of rebound bubbles can be better eliminated or alleviated. Therefore, preferably, L'=½ L.

It should be noted that in the direction pointing from the planar portion PP to the corner portion JP, the corner portion JP has multiple arc segments, and the multiple arc segments are combined together to form the corner portion JP. That is, in the direction pointing from the planar portion PP to the corner portion JP, the corner portion JP can be discretely divided into multiple arc segments. On the same arc surface, one end point of each arc segment is located on the boundary line between the planar portion PP and the corner portion JP, and another end point is located on the boundary of the corner portion JP away from the planar portion PP, and the arc length of each arc segment is L. The arc lengths of multiple arc segments can be same or different. When the arc lengths of multiple arc segments are different, the arc lengths L of each arc segment have different values. When the arc lengths of multiple arc segments are same, the arc lengths L of each arc segment has the same value. Correspondingly, the distance between the first groove 201 and the boundary of the corner portion JP away from the planar portion PP refers to the arc length between the point on the center line of the first groove 201 and the point on the boundary of the corner portion JP away from the planar portion PP, in which the size of L' depends on the size of L.

Referring to FIG. 9, two second dividing lines FL2 between the corner portions JP and the first sub-edge portion SP1 as well as the second sub-edge portion SP2 are extended toward the planar portion PP, and the two dividing lines FL2 intersect at point O, connecting point O with points on the outer boundary of the first sub-backplane 21 to form a plurality of first connecting lines. Finding a point P on each of the first connecting lines having a distance of L' to the outer boundary of the first sub-backplane 21, and connecting each point P on each of the first connecting line to form a second connecting line. Then the first groove 201 can be formed by slotting the first sub-backplane 21 along the second connecting line. The process of slotting the first sub-backplane 21 includes a cutting process, and the like. When the first groove 201 is formed by using the cutting process, the second connecting line is the cutting line, and the cutting slot formed after cutting is the first groove 201. That is, the first groove 201 is a cutting groove with a relatively small slotting width, and which is a linear groove. The linear groove means that the slotting width is relatively small, and the slotting width is approximately the thickness of a line segment. For example, the width of the first groove 201 is greater than 0 micron and less than or equal to 0.5 microns to ensure the overall support performance of the backplane 20 to the display panel 10 in the Gaussian corner region GD, therefore, while eliminating or alleviating the problem of rebound bubbles, the risk of wrinkles appearing in the Gaussian corner region GD can also be eliminated or reduced.

In one embodiment, referring to FIG. 2 to FIG. 10, FIG. 10 is a schematic diagram of another planar structure of a display module 100 provided by an embodiment of the present disclosure. Different from the above embodiment, referring to FIG. 10, at least one second groove 202 is provided on the side of the edge portion SP away from the display panel 10, so as to avoid the rebound bubbles appearing in the first sub-curved regions BD1 and the second sub-curved regions BD1. The second groove 202 is spaced apart from the first groove 201, that is, the second groove 202 and the first groove 201 are not connected to avoid great impact on the support performance of the backplane 20 in the Gaussian corner regions GD.

Optionally, the depth of the second groove 202 is equal to the depth of the first groove 201; and/or, the width of the second groove 202 is equal to the width of the first groove 201; and/or, the distance between the second groove 202 and the boundary of the edge portion SP away from the planar portion PP is equal to the distance between the first groove 201 and the boundary of the corner portion JP away from the planar portion PP. Optionally, the cross-sectional shape of the first groove 201 includes an arc line, and the cross-sectional shape of the second groove 202 is a straight line.

In addition, it should be noted that since wrinkles are less likely to appear in the first sub-curved regions BD1 and the second sub-curved regions BD2 in the curved region BD than in the Gaussian corner region GD, so that the second groove 202 disposed on the edge portion SP is arranged in such a way, as long as the second groove 202 can eliminate or reduce the risk of wrinkles appearing in the first sub-curved regions BD1 and the second sub-curved regions BD2. Therefore, the design requirements for the second groove 202 may be lower than the design requirements for the first groove 201. For example, when designing the second groove 202, the width of the second groove 202 may not be strictly controlled, and the width of the second groove 202 can be greater than the width of the first groove 201. Alternatively, when designing the second groove 202, it is not necessary to strictly control the depth of the second groove 202 as well as the distance between the second groove 202 and the boundary of the edge portion SP away from the planar portion PP. For example, the depth of the second groove 202 is greater than or less than the depth of the first groove 201, it is only required that the second groove 202 is located on the edge portion SP. In other words, the first groove 201 located on the corner portion JP can be applied to the edge portion SP, but the second groove 202 located on the edge portion SP may not necessarily be applied to the corner portion JP. Please refer to the above embodiments for other descriptions, which will not be described again herein.

In one embodiment, referring to FIG. 2 to FIG. 11, FIG. 11 is a schematic diagram of another structure of a first groove 201 provided by an embodiment of the present disclosure. Different from the above embodiment, referring to FIG. 11, the first groove 201 includes a plurality of first sub-grooves 2011 arranged at intervals, that is, the first groove 201 is discontinuous to further reduce the impact of providing the first groove 201 on the support performance of the first sub-backplane 21. In this way, while eliminating or alleviating the problem of rebound bubbles, the risk of wrinkles appearing in the Gaussian corner region GD can be further eliminated or reduced. Apparently, the second groove 202 also includes a plurality of second sub-grooves arranged at intervals. Please refer to the above embodiments for other descriptions, which will not be described again here.

In one embodiment, referring to FIG. 2 to FIG. 12, FIG. 12 is a schematic diagram of yet another structure of a first groove 201 provided by an embodiment of the present disclosure. Different from the above embodiment, referring to FIG. 12, the cross-sectional shape of the first groove 201 is a curved line. Apparently, the cross-sectional shape of the second groove 202 may also be a curved line. In addition, the present disclosure is not limited to the cross-sectional shapes of the first groove 201 and the second groove 202 described above. The cross-sectional shapes of the first groove 201 and the second groove 202 can also be other regular or irregular shapes, such as wavy lines, folding lines, and the like. Please refer to the above embodiments for other descriptions, which will not be described again herein.

Based on the same inventive concept, the present disclosure further provides a display device, the display device includes any one of the display modules 100 described in the above embodiments. The display device may include, but is not limited to, wearable devices such as smart bracelets, smart watches, Virtual Reality (VR), mobile phones, e-books and electronic newspapers, televisions, personal portable computers, foldable and flexible OLED display devices and other flexible OLED display devices.

According to the above embodiments, it can be known that:

In the display module and the display device provided by the present disclosure, the display module includes a planar region and a curved region located outside the planar region; the display module further includes a display panel and a backplane disposed on the non-light-exiting side of the display panel. The backplane includes a planar portion disposed corresponding to the planar region and a curved portion disposed corresponding to the curved region. The curved portion includes a plurality of edge portions and corner portions connected between two adjacent ones of the edge portions. A first groove is disposed on a side of one of the corner portions away from the display panel. The backplane further includes a first sub-backplane and a second sub-backplane located on a side of the first sub-backplane close to the display panel. The first groove penetrates through the first sub-backplane, and the first groove can release the bending stress in the corner portions of the backplane to reduce the rebound force at the corner portions of the backplane, thereby reducing the risk of appearance of rebound bubbles caused by the peeling between the display panel and the cover plate with a curved surface, and thus addressing the technical problem that bubbles are easily appearing at the Gaussian curved surface of the existing four-curved screen after laminating.

In the above embodiments, each embodiment is described with its own emphasis. For parts that are not described in detail in a certain embodiment, reference can be made to the relevant descriptions of other embodiments.

The embodiments of the present disclosure have been introduced in detail above. Specific examples are used herein to illustrate the principles and implementations of the present disclosure, and the above description of the embodiments is merely intended to help understand the technical solution and its core idea of the present disclosure. It should be understood that, a person skilled in the art may modify the technical solutions recorded in the foregoing embodiments, or to equivalently replace some of the technical features. However, these modifications or replacements do not cause the essence of the corresponding technical solution to depart from the scope of the technical solution of each embodiment of the present disclosure.

What is claimed is:

1. A display module comprising a planar region and a curved region located outside the planar region; wherein the display module further comprises:
   a display panel; and
   a backplane disposed on a non-light-exiting side of the display panel, wherein the backplane comprises a planar portion disposed corresponding to the planar region and a curved portion disposed corresponding to the curved region, and the curved portion comprises a plurality of edge portions and corner portions connected between two adjacent ones of the edge portions;
   wherein the backplane further comprises a first sub-backplane and a second sub-backplane located on a side of the first sub-backplane close to the display panel, a first groove is disposed on a side of one of the corner portions away from the display panel, and the first groove penetrates through the first sub-backplane.

2. The display module according to claim 1, wherein a thickness of each of the first sub-backplane and the second sub-backplane is greater than or equal to 25 microns, and a thickness of the backplane is less than or equal to 200 microns.

3. The display module according to claim 2, wherein an elastic modulus of the backplane is greater than or equal to 3 GPa.

4. The display module according to claim 1, wherein the first groove extends from the at least one of the corner portions to an adjacent edge portion of the edge portions, and an extension length of the first groove in the adjacent edge portion is less than an extension length of the first groove in the at least one of the corner portions.

5. The display module according to claim 4, wherein the extension length of the first groove in the adjacent edge portion is greater than or equal to 0 millimeters and less than or equal to 1 millimeter.

6. The display module according to claim 1, wherein a width of the first groove is greater than 0 microns and less than or equal to 0.5 microns.

7. The display module according to claim 1, wherein a minimum distance between the first groove and a boundary of the at least one of the corner portions away from the planar portion is greater than 0.

8. The display module according to claim 7, wherein in a direction pointing from the planar portion to the at least one of the corner portions, an arc length of the at least one of the corner portions is L, and a distance between the first groove and the boundary of the at least one of the corner portions away from the planar portion is L', wherein $\frac{1}{3}L \leq L' \leq \frac{2}{3}L$.

9. The display module according to claim 8, wherein $L' = \frac{1}{2}L$.

10. The display module according to claim 7, wherein the curved region comprises a first display region and a frame region located on a side of the first display region away from the planar region, and the first groove is disposed corresponding to the first display region.

11. The display module according to claim 7, wherein a second groove is disposed on a side of at least one of the edge portions away from the display panel, and the second groove is spaced apart from the first groove.

12. The display module according to claim 11, wherein a cross-sectional shape of the first groove comprises at least one of an arc line and a curved line; and/or, a cross-sectional shape of the second groove comprises at least one of a straight line and a curved line.

13. The display module according to claim 11, wherein the first groove comprises a plurality of first sub-grooves disposed at intervals; and/or, the second groove comprises a plurality of second sub-grooves disposed at intervals.

14. The display module according to claim 1, wherein the display module further comprises a protective layer and a support functional layer, the protective layer is disposed on a side of the display panel away from the backplane, and the support function layer is disposed on a side of the backplane away from the display panel.

15. A display device comprising a display module, wherein the display module comprises a planar region and a curved region located outside the planar region; the display module further comprises:
 a display panel; and
 a backplane disposed on a non-light-exiting side of the display panel, wherein the backplane comprises a planar portion disposed corresponding to the planar region and a curved portion disposed corresponding to the curved region, and the curved portion comprises a plurality of edge portions and corner portions connected between two adjacent ones of the edge portions;
 wherein the backplane further comprises a first sub-backplane and a second sub-backplane located on a side of the first sub-backplane close to the display panel, a first groove is disposed on a side of one of the corner portions away from the display panel, and the first groove penetrates through the first sub-backplane.

16. The display device according to claim 15, wherein the first groove extends from the at least one of the corner portions to an adjacent edge portion of the edge portions, and an extension length of the first groove in the adjacent edge portion is less than an extension length of the first groove in the at least one of the corner portions.

17. The display device according to claim 15, wherein a width of the first groove is greater than 0 microns and less than or equal to 0.5 microns.

18. The display device according to claim 15, wherein a minimum distance between the first groove and a boundary of the at least one of the corner portions away from the planar portion is greater than 0.

19. The display device according to claim 18, wherein in a direction pointing from the planar portion to the at least one of the corner portions, an arc length of the at least one of the corner portions is L, and a distance between the first groove and the boundary of the at least one of the corner portions away from the planar portion is L', wherein $\frac{1}{3}L \leq L' \leq \frac{2}{3}L$.

20. The display device according to claim 18, wherein the curved region comprises a first display region and a frame region located on a side of the first display region away from the planar region, and the first groove is disposed corresponding to the first display region.

* * * * *